United States Patent
Fukami

(10) Patent No.: US 8,339,342 B2
(45) Date of Patent: Dec. 25, 2012

(54) LIQUID CRYSTAL DISPLAY DEVICE

(75) Inventor: Tetsuo Fukami, Ishikawa-gun (JP)

(73) Assignee: Japan Display Central Inc., Fukaya-shi (JP)

( * ) Notice: Subject to any disclaimer, the term of this patent is extended or adjusted under 35 U.S.C. 154(b) by 853 days.

(21) Appl. No.: 12/346,109

(22) Filed: Dec. 30, 2008

(65) Prior Publication Data

US 2009/0174637 A1 Jul. 9, 2009

(30) Foreign Application Priority Data

Jan. 7, 2008 (JP) ................................ 2008-000578

(51) Int. Cl.
*G09G 3/36* (2006.01)
*G02F 1/133* (2006.01)

(52) U.S. Cl. ............... 345/87; 345/204; 349/33; 349/56

(58) Field of Classification Search ........................ None
See application file for complete search history.

(56) References Cited

U.S. PATENT DOCUMENTS

| | | | |
|---|---|---|---|
| 6,268,895 B1 * | 7/2001 | Shimada et al. | 349/110 |
| 2007/0222930 A1 * | 9/2007 | Fukami et al. | 349/126 |
| 2007/0273634 A1 * | 11/2007 | Fukami et al. | 345/98 |

FOREIGN PATENT DOCUMENTS

| | | |
|---|---|---|
| JP | 3-198030 | 8/1991 |
| JP | 5-265032 | 10/1993 |
| JP | 8-160451 | 6/1996 |
| JP | 2006-208530 | 8/2006 |

OTHER PUBLICATIONS

Japanese Office Action issued May 15, 2012, in Japan patent Application No. 2008-000578 (with English translation).

* cited by examiner

*Primary Examiner* — Andrew L Sniezek
(74) *Attorney, Agent, or Firm* — Oblon, Spivak, McClelland, Maier & Neustadt, L.L.P.

(57) ABSTRACT

A liquid crystal display device is configured such that a liquid crystal layer is held between a pair of substrates. The liquid crystal display device includes, in a display area including a plurality of pixels, pixel electrodes which are disposed in association with the respective pixels, a counter-electrode which is disposed to be opposed to the pixel electrodes via the liquid crystal layer, scanning lines which are disposed along a row direction of the pixels, signal lines which are disposed along a column direction of the pixels, and an electrically conductive layer which is disposed to be opposed to the counter-electrode via the liquid crystal layer between neighboring ones of the pixel electrodes, and has such a potential as to provide a black display voltage relative to a potential of the counter-electrode.

8 Claims, 4 Drawing Sheets

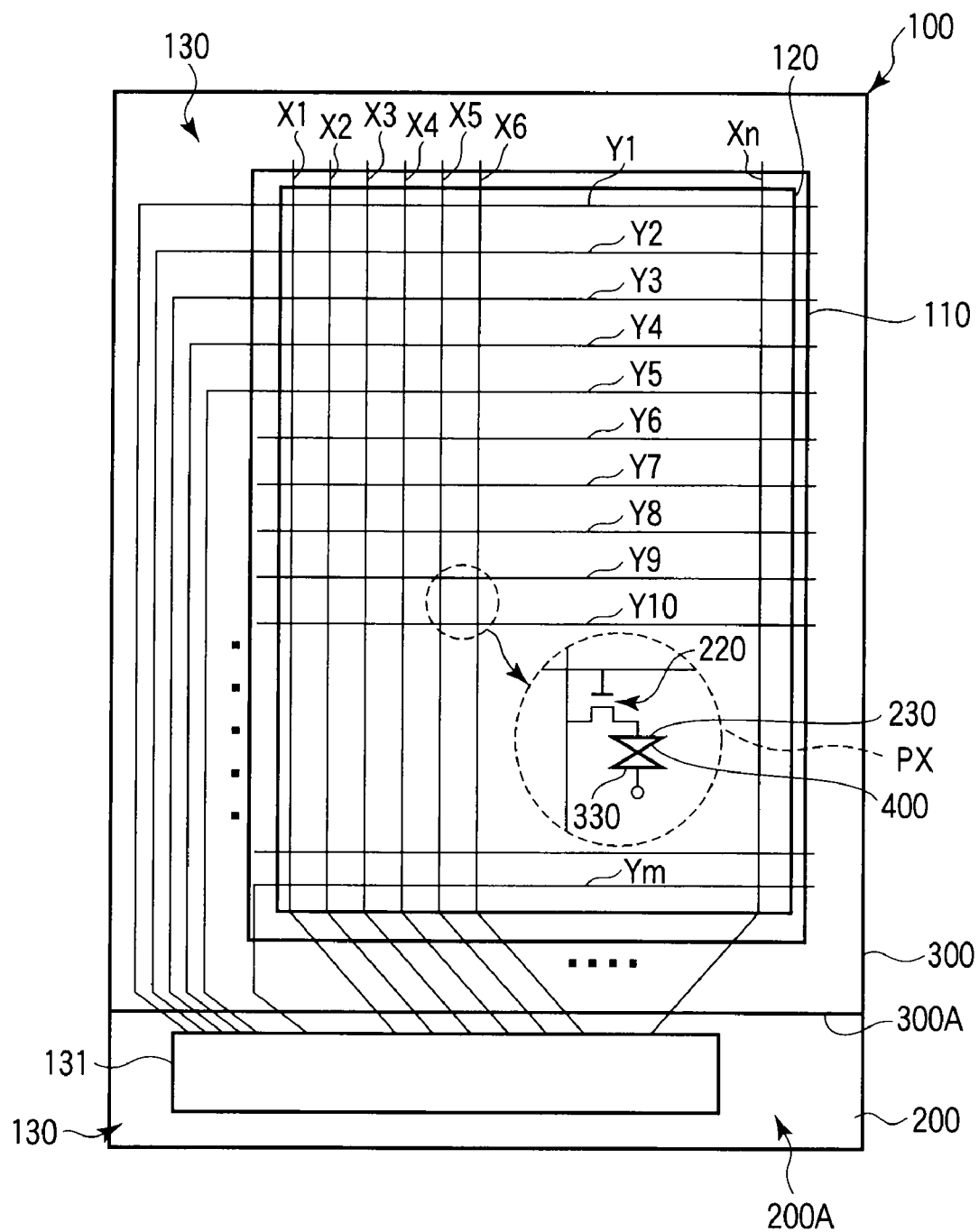
F I G. 1

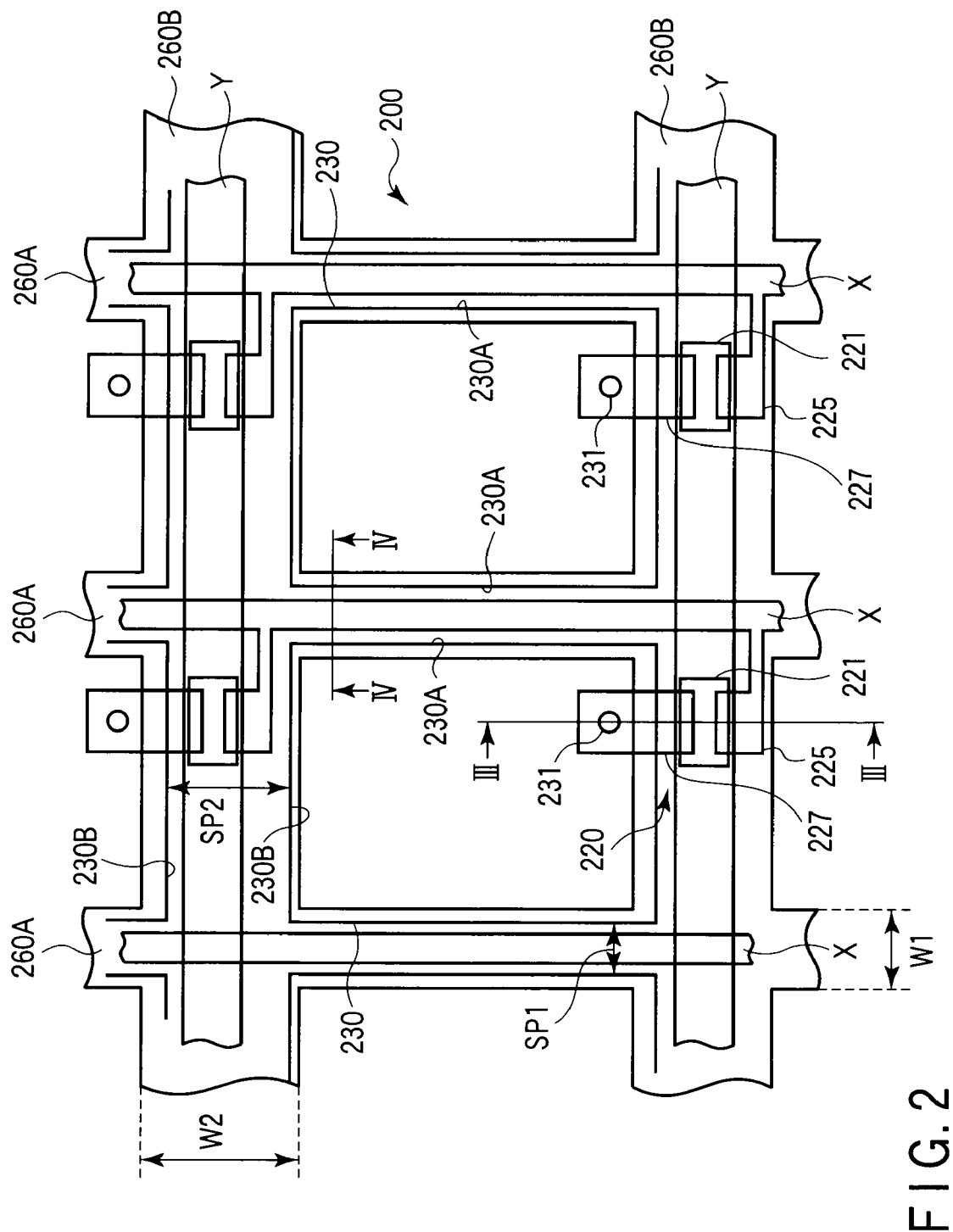
F I G. 2

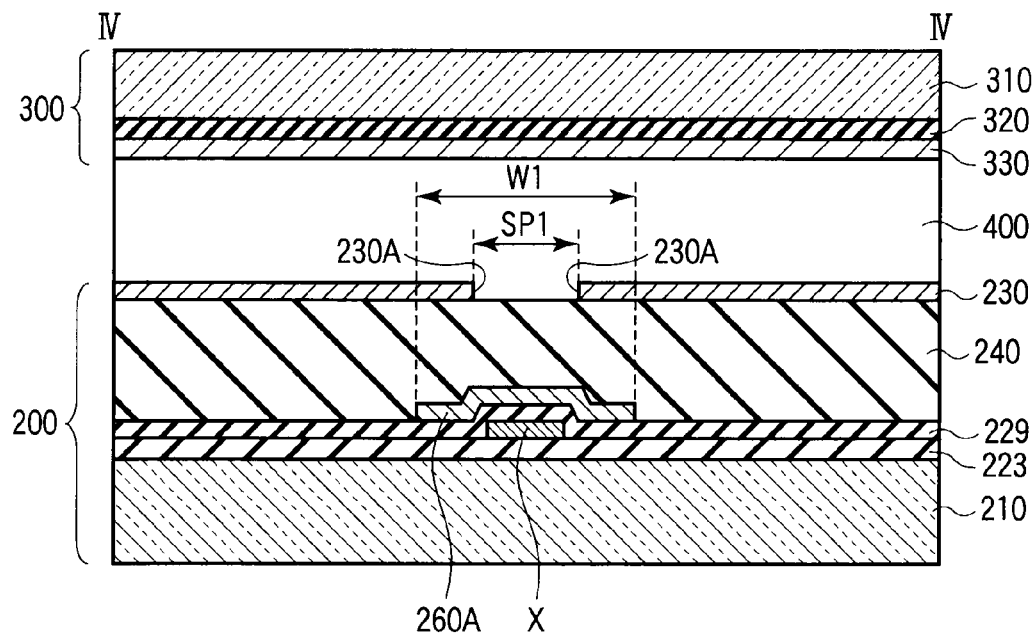
F I G. 4
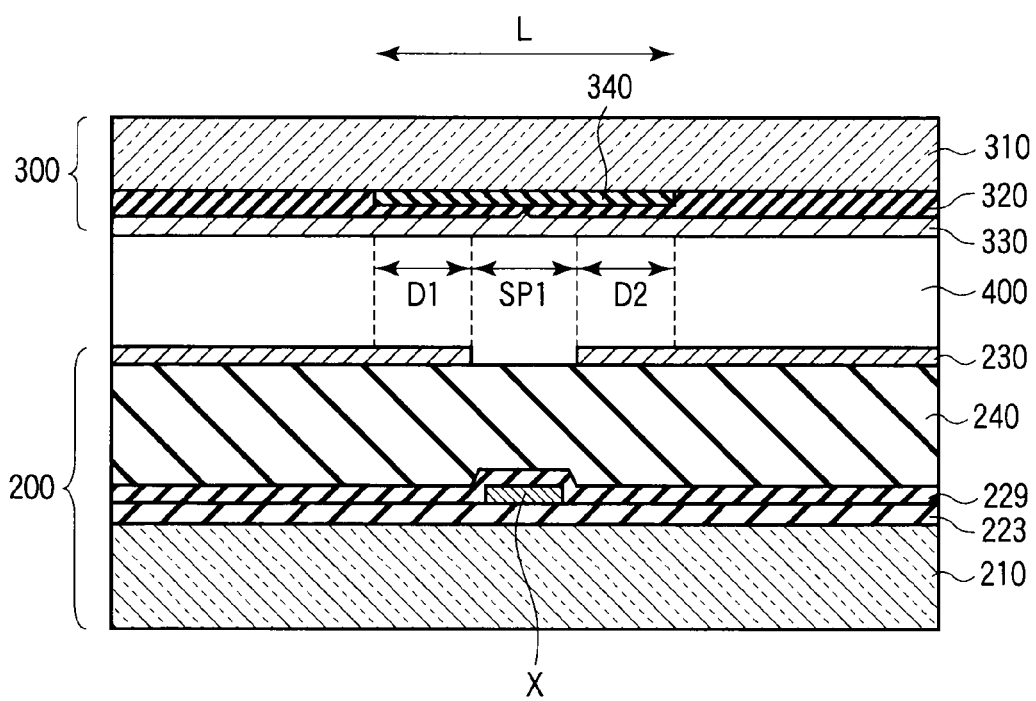
F I G. 5

LIQUID CRYSTAL DISPLAY DEVICE

CROSS-REFERENCE TO RELATED APPLICATIONS

This application is based upon and claims the benefit of priority from prior Japanese Patent Application No. 2008-000578, filed Jan. 7, 2008, the entire contents of which are incorporated herein by reference.

BACKGROUND OF THE INVENTION

1. Field of the Invention

The present invention relates generally to a liquid crystal display device, and more particularly to a liquid crystal display device which prevents light leak between pixels.

2. Description of the Related Art

A liquid crystal display device, which is a representative one of flat-panel display devices, includes a liquid crystal display panel which is configured such that a liquid crystal layer is held between an array substrate and a counter-substrate which are attached to each other via a sealant. The liquid crystal display panel includes pixels which are arrayed in a matrix on a display area.

In this liquid crystal display panel, in some cases, light leak occurs between pixels. To cope with this problem, there is proposed a liquid crystal display panel including a light-blocking layer, i.e. a black matrix (BM), which is disposed in a lattice shape on the counter-substrate side in order to prevent light leak between pixels (Jpn. Pat. Appln. KOKAI Publication No. 2006-208530).

In the above-described structure in which the black matrix is disposed on the counter-substrate side, it is necessary to take into account misalignment between the array substrate and the counter-substrate, and light leak between pixels at a time of viewing in an oblique direction. In this structure, it is necessary to increase the width of the black matrix, and there may be a case in which a width of 10 μm or more is needed. Thus, there is such a problem that the ratio of an opening portion ("aperture ratio"), through which light from each pixel passes, decreases.

In particular, in recent years, a liquid crystal display panel which is mounted on, e.g. mobile phones, has an increasing demand for higher fineness and has a tendency that the pixel decreases. For example, in a liquid crystal display panel with 250 ppi (pixel per inch), the size of one dot (i.e. a set of an R pixel, a G pixel and a B pixel) is about 100 μm, and the size of a sub-pixel (e.g. an R pixel unit element) is about 30 μm, that is ⅓ of the size of the dot. In this high-fineness panel, a black matrix with a large width may become a major factor of a decrease in aperture ratio.

BRIEF SUMMARY OF THE INVENTION

The present invention has been made in consideration of the above-described problem, and the object of the invention is to provide a liquid crystal display device which can improve an aperture ratio and realize a good display quality, while preventing light leak between pixels.

According to an aspect of the present invention, there is provided a liquid crystal display device which is configured such that a liquid crystal layer is held between a pair of substrates, the liquid crystal display device, in a display area including a plurality of pixels, comprising: pixel electrodes which are disposed in association with the respective pixels; a counter-electrode which is disposed to be opposed to the pixel electrodes via the liquid crystal layer; scanning lines which are disposed along a row direction of the pixels; signal lines which are disposed along a column direction of the pixels; and an electrically conductive layer which is disposed to be opposed to the counter-electrode via the liquid crystal layer between neighboring ones of the pixel electrodes, and has such a potential as to provide a black display voltage relative to a potential of the counter-electrode.

The present invention can provide a liquid crystal display device which can improve an aperture ratio and realize a good display quality, while preventing light leak between pixels.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 schematically shows the structure of a liquid crystal display panel of a liquid crystal display device according to an embodiment of the present invention;

FIG. 2 is a plan view that schematically shows the structure of pixels in the liquid crystal display panel shown in FIG. 1;

FIG. 4 is a cross-sectional view, taken along line IV-IV in FIG. 2, showing a cross-sectional structure of the liquid crystal display panel shown in FIG. 2; and FIG. 5 is a cross-sectional view that schematically shows the structure of a liquid crystal display panel of a liquid crystal display device according to a comparative example for comparison with the present embodiment.

DETAILED DESCRIPTION OF THE INVENTION

Figure 3:
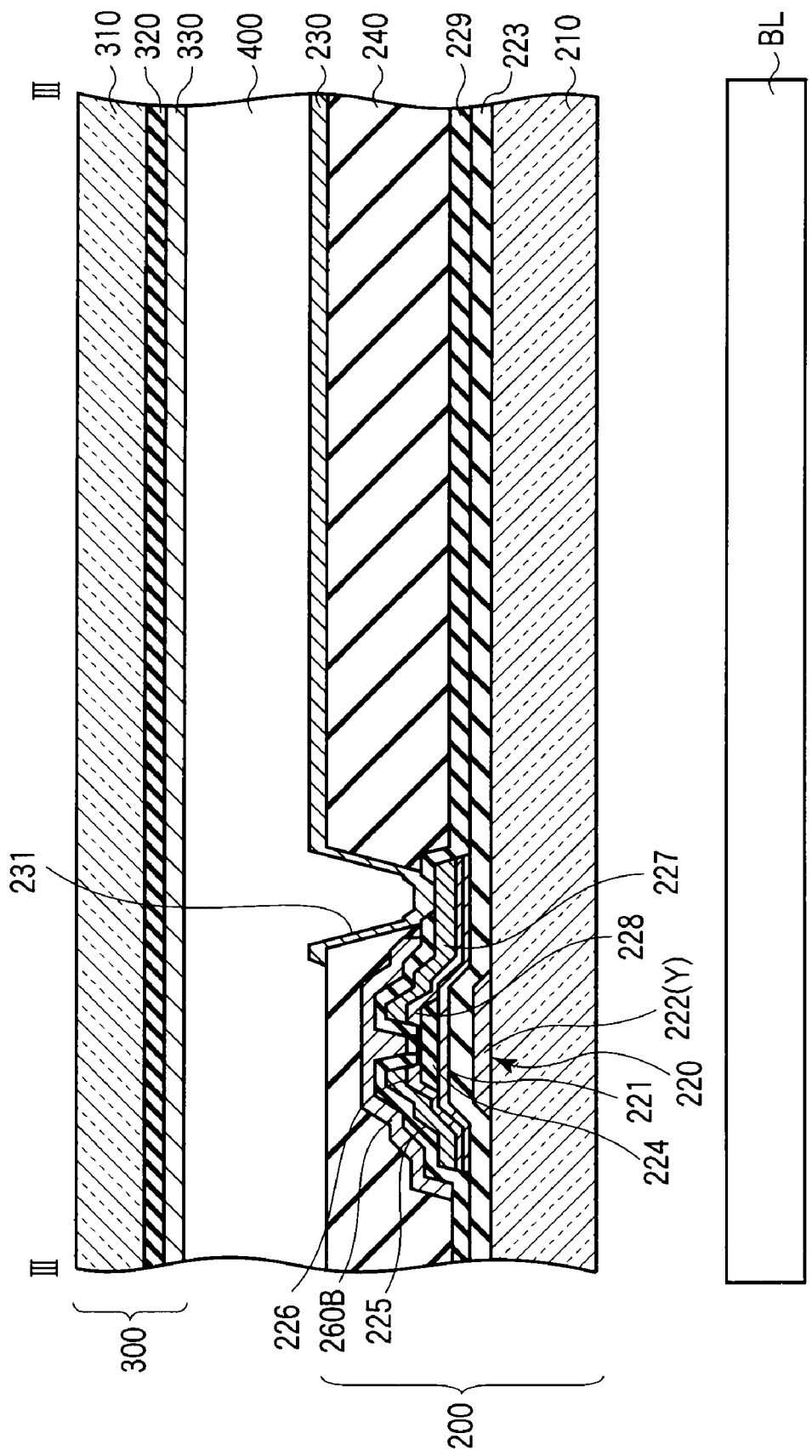
FIG. 3 is a cross-sectional view, taken along line III-III in FIG. 2, showing a cross-sectional structure of the liquid crystal display panel shown in FIG. 2.

A liquid crystal display device according to an embodiment of the present invention will now be described with reference to the accompanying drawings.

As is shown in FIG. 1, a liquid crystal display device includes a liquid crystal display panel 100. The liquid crystal display panel 100 comprises a pair of substrates, namely, an array substrate 200 and a counter-substrate 300, and a liquid crystal layer 400 which is held between the array substrate 200 and the counter-substrate 300.

The array substrate 200 and counter-substrate 300 are attached via a sealant 110, and a predetermined gap for holding the liquid crystal layer 400 is formed between the array substrate 200 and counter-substrate 300. The liquid crystal display panel 100 includes a display area 120, which displays an image, within a region surrounded by the sealant 110. The display area 120 is composed of a plurality of display pixels PX which are arrayed in a matrix.

The array substrate 200 includes, in the display area 120, a plurality of scanning lines Y (1, 2, 3, . . . , m) which are disposed in a row direction of the pixels PX, a plurality of signal lines X (1, 2, 3, . . . , n) which are disposed in a column direction of the pixels PX, switch elements 220 which are disposed at intersection parts between the signal lines X and scanning lines Y in the respective pixels PX, and pixel electrodes 230 which are disposed in the respective pixels PX and are connected to the switch elements 220.

The counter-substrate 300 includes, in the display area 120, a counter-electrode 330 which is common to the plural pixels PX in such a manner that the counter-electrode 330 is opposed to the pixel electrodes 230 via the liquid crystal layer 400.

The liquid crystal display panel 100 includes a connection section 131 which is disposed on an outer peripheral section 130 that is located outside the display area 120. The connection section 131 is connectable, for example, to a driving IC chip functioning as a signal supply source and to a flexible wiring board. In the example shown in FIG. 1, the connection section 131 is disposed on an extension section 200A of the array substrate 200, which extends outward from an end portion 300A of the counter-substrate 300.

The scanning lines Y (1, 2, 3, . . . , m), which are disposed on the display area 120, are connected to the connection section 131 via the outer peripheral section 130. The signal lines X (1, 2, 3, . . . , n) are similarly connected to the connection section 131 via the outer peripheral section 130.

Next, referring to FIG. 2 to FIG. 4, the structures of the array substrate 200 and counter-substrate 300 are described in greater detail.

The array substrate 200 is formed by using a light-transmissive insulating substrate 210 such as a glass substrate.

Each of the switch elements 220 is composed of, e.g. a thin-film transistor (TFT) which includes a semiconductor layer 221 such as an amorphous silicon film or a polycrystalline silicon film.

A gate electrode 222 of the switch element 220 is covered with a gate insulation film 223. The gate electrode 222 is connected to the scanning line Y (or the gate electrode 222 is formed integral with the scanning line Y). The gate electrode 222 and scanning line Y are formed of, e.g. molybdenum-tungsten (MoW). The gate insulation film 223 is formed of, e.g. a silicon oxide (SiO) film or a silicon nitride (SiN) film. The semiconductor layer 221 is disposed on the gate insulation film 223, and a channel region of the semiconductor layer 221 is covered with a protection film 224.

A source electrode 225 of the switch element 220 is put in contact with the semiconductor layer 221 via a low-resistance film 226. The source electrode 225 is connected to the signal line X (or the source electrode 225 is formed integral with the signal line X). A drain electrode 227 of the switch element 220 is put in contact with the semiconductor layer 221 via a low-resistance film 228. The source electrode 225, drain electrode 227 and signal line X are formed of, e.g. a multi-layer structure in which molybdenum (Mo)/aluminum (Al)/molybdenum (Mo) layers are stacked in the named order.

The source electrode 225 and drain electrode 227 are covered with an interlayer insulation film 229. The interlayer insulation film 229 is formed of, e.g. silicon nitride (SiN). The interlayer insulation film 229 is covered with an insulation film (e.g. organic insulation film (hard resin coat)) 240.

The pixel electrode 230 is disposed on the insulation film 240 and is electrically connected to the drain electrode 227 via a contact hole 231 which is formed in the interlayer insulation film 229 and insulation film 240. The pixel electrode 230 is formed of a light-transmissive electrically conductive material such as indium tin oxide (ITO) or indium zinc oxide (IZO).

The counter-substrate 300 is formed by using a light-transmissive insulating substrate 310 such as a glass substrate. A color display type liquid crystal display device includes a plurality of kinds of pixels, for instance, a red pixel that displays red (R), a green pixel that displays green (G), and a blue pixel that displays blue (B). In this liquid crystal display device, the counter-substrate 300 includes, in the display area 120, a color filter layer 320 on one major surface of the insulating substrate 310 (i.e. a surface facing the liquid crystal layer 400). Specifically, the counter-substrate 300 includes, on the insulating substrate 310, a red color filter which passes light with a principal wavelength of red in association with the red pixel, a green color filter which passes light with a principal wavelength of green in association with the green pixel, and a blue color filter which passes light with a principal wavelength of blue in association with the blue pixel.

The counter-electrode 330 is disposed on the color filter layer 320 in the display area 120. The counter-electrode 330 is formed of a light-transmissive, electrically conductive material such as ITO or IZO.

Those surfaces of the array substrate 200 and counter-substrate 300, which face the liquid crystal layer 400, are covered with alignment films (not shown) for controlling the alignment of liquid crystal molecules included in the liquid crystal layer 400. The outer surfaces of the array substrate 200 and counter-substrate 300 are provided with optical elements (not shown) including polarizers which have polarization directions that are set in accordance with the characteristics of the liquid crystal layer 400.

Further, the liquid crystal display device includes a backlight unit BL which illuminates the liquid crystal display panel 100 from the outer surface side of the array substrate 200.

In the example shown in FIG. 2, the pixel electrode 230 is disposed such that end portions thereof do not overlap the signal line X and scanning line Y via various insulation films (gate insulation film 223, interlayer insulation film 229 and insulation film 240). Specifically, as shown in FIG. 2, in the major plane of the array substrate 200, the pixel electrode 230 is disposed at a position that is displaced from a position opposed to the signal line X and scanning line Y. Specifically, in the cross section of the array substrate 200, the pixel electrode 230 is disposed at a position with a displacement from a position immediately above the signal line X and scanning line Y. In this manner, the signal line X is disposed between the pixel electrodes 230 which neighbor in the row direction, and the scanning line Y is disposed between the pixel electrodes 230 which neighbor in the column direction.

In addition, the array substrate 200 includes an electrically conducive layer 260. The conductive layer 260 is disposed between the neighboring pixel electrodes 230, and is opposed to the counter-electrode 330 via the liquid crystal layer 400. The conductive layer 260 is supplied with such a potential that a black display voltage Vb is produced relative to the potential of the counter-electrode 330. The conductive layer 260, for example, is led out of the display area 120, and is connected to a driver via a common wiring line. The driver outputs a voltage with such a potential as to constantly provide the black display voltage Vb to the conductive layer 260 when the liquid crystal display device is in an ON state.

When the conductive layer 260 is supplied with such a potential as to provide the black display voltage Vb, the black display voltage Vb is applied to the liquid crystal layer 400 by the potential difference between the conductive layer 260 and the counter-electrode 330 between the neighboring pixel electrodes 230. By the application of the black display voltage Vb, the alignment of the liquid crystal molecules is controlled and black display is effected. Thereby, light blocking can be effected between the pixel electrodes 230.

In short, the conductive layer 260 can be used as a black matrix for light blocking between the pixel electrodes 230, that is, between the pixels PX. Therefore, according to this structure, in order to prevent light leak between the pixels PX, there is no need to give consideration to misalignment between the array substrate 200 and counter-substrate 300, and sure inter-pixel light blocking can be effected without disposing a large-width black matrix. In addition, even when the liquid crystal display panel 100 is viewed in an oblique direction, light leak between pixels can be prevented.

Hence, the aperture ratio can be improved. Moreover, a decrease in contrast ratio due to light leak between pixels can be suppressed, and a good display quality can be obtained.

In the example shown in FIG. 3 and FIG. 4, the conductive layer 260 is disposed between the interlayer insulation film 229 and insulation film 240. In this structure, since the insulation film 240 lies between the liquid crystal layer 400 and conductive layer 260, it is necessary to take into account the loss in the insulation film 240 in order to apply the black display voltage Vb to the liquid crystal layer 400. In other words, in the case of applying Vb as the black display voltage to the pixel electrode 230, it is preferable to supply the conductive layer 260 with a voltage higher than Vb, i.e. (Vb+α). The value of α is determined by the material and thickness of the insulation film 240.

Such a voltage may be an AC voltage. Specifically, when the potential of the counter-electrode 330 is Vcom, the conductive layer 260 may be supplied with a voltage (Vcom±(V+α)). In this case, the voltage that is applied to the conductive layer 260 becomes a rectangular wave having a frequency which is substantially equal to a driving frequency of the liquid crystal display panel 100, e.g. 60 Hz.

In the example shown in FIG. 2, the conductive layer 260 is composed of a conductive layer 260A which is disposed in the column direction, and a conductive layer 260B which is disposed in the row direction. The conductive layer 260A is disposed so as to overlap the signal line X via the interlayer insulation film 229. The conductive layer 260A is disposed above the signal line X and is disposed below the pixel electrode 230. The conductive layer 260B is disposed so as to overlap the scanning line Y via the interlayer insulation film 229. The conductive layer 260B is disposed above the scanning line Y and is disposed below the pixel electrode 230. As shown in FIG. 3 and FIG. 4, the conductive layers 260A and 260B are electrically insulated from the scanning line Y, signal line X and pixel electrode 230, and are disposed and integrally formed between the interlayer insulation film 229 and insulation film 240.

Preferably, the width of the conductive layer 260 should be set to be greater than the spacing between neighboring pixel electrodes 230 in consideration of the misalignment between the pixel electrode 230 and conductive layer 260. Specifically, the conductive layer 260 should preferably be disposed so as to overlap end portions of the neighboring pixel electrodes 230 via the insulation layer.

For example, as shown in FIG. 2 and FIG. 4, the conductive layer 260A is formed such that the width W1 thereof is greater than the spacing SP1 between the pixel electrodes 230 which neighbor in the row direction. In other words, the conductive layer 260A is disposed so as to overlap end portions 230A of the pixel electrodes 230 which neighbor in the row direction.

In addition, as shown in FIG. 2, the conductive layer 260B is formed such that the width W2 thereof is greater than the spacing SP2 between the pixel electrodes 230 which neighbor in the column direction. In other words, the conductive layer 260B is disposed so as to overlap end portions 230B of the pixel electrodes 230 which neighbor in the column direction.

Since the conductive layers 260A and 260B are supplied with such a potential as to produce the black display voltage Vb relative to the potential of the counter-electrode 330, light blocking can be effected in the gap between the pixel electrodes 230 which neighbor in the row direction and also light blocking can be effected in the gap between the pixel electrodes 230 which neighbor in the column direction.

The conductive layer 260 should preferably be formed of a light-transmissive, electrically conductive material, such as ITO or IZO, in the above-described structure in which the width of the conductive layer 260 is set to be greater than the spacing between the neighboring pixel electrodes 230 and the conductive layer 260 is so disposed as to overlap the end portions 230A and 230B of the pixel electrodes 230.

Specifically, in the region where the conductive layer 260 and pixel electrode 230 overlap, the alignment of liquid crystal molecules is suppressed by the potential difference between the counter-electrode 330 and the pixel electrode 230. Since the conductive layer 260 has light transmissivity, backlight passes and contributes to display in a state in which a white display voltage is applied between the counter-electrode 330 and pixel electrode 230. Thus, in the liquid crystal display panel 100, even if the width of the conductive layer 260 is increased in consideration of the misalignment between the pixel electrode 230 and conductive layer 260, it is possible to prevent a decrease in aperture ratio in the region where the pixel electrode 230 and conductive layer 260 overlap.

FIG. 5 shows a comparative example for comparison with the present embodiment. In a liquid crystal display panel according to the comparative example, the counter-substrate 300 includes a black matrix 340. The black matrix 340 is disposed in the column direction and row direction so as to be opposed to wiring portions, such as the signal line X, scanning line Y and switch element 220, via the liquid crystal layer 400. The black matrix 340 is formed of, e.g. a black resin material.

The width of the black matrix 340 is set in consideration of misalignment between the array substrate 200 and counter-substrate 300 and light leak at a time of viewing in an oblique direction. In the example shown in FIG. 5, the width L of the black matrix 340, which is opposed to the signal line X, is set at a value which is obtained by adding distances D1 and D2, which are set in consideration of a margin of, e.g. misalignment, to the spacing SP1 between the pixel electrodes 230 neighboring in the row direction. Although not shown, the width of the black matrix 340, which is opposed to the scanning line Y, is set at a value which is obtained by adding distances, which are set in consideration of a margin of, e.g. misalignment, to the spacing SP2 between the pixel electrodes 230 neighboring in the column direction.

According to the present embodiment shown in FIG. 4, compared to the comparative example shown in FIG. 5, the width W1 of the conductive layer 260 can be set to be less than the width L of the black matrix 340. Therefore, according to the present embodiment, a decrease in aperture ratio can be suppressed.

In the present embodiment and the comparative example, the consumption (%) of the aperture ratio was measured. In a WVGA (800×480) liquid crystal display panel with an 8-inch diagonal screen size, the consumption of the aperture ratio in the present embodiment was improved by about 6%, compared to the consumption of the aperture ratio in the comparative example. The effect of suppression of the consumption of the aperture ratio varies depending on the size and resolution of the liquid crystal display panel. As the size of the liquid crystal display panel is smaller, and as the resolution is higher, the effect of improvement in aperture ratio becomes greater.

As has been described above, according to the present embodiment, the aperture ratio can be improved and the good display quality can be realized, while light leak between pixels is prevented.

In the example shown in FIG. 2, the conductive layer 260 is disposed so as to be opposed to the signal line X and scanning line Y in the column direction and row direction. The structure in this case is desirable, and the effect of improvement of the aperture ratio is highest. Alternatively, however, the conductive layer 260 may be disposed so as to be opposed to either the signal line X or the scanning line Y. In the case where the conductive layer 260 is disposed in a manner to overlap the signal line X in the column direction, the black matrix 340 is disposed so as to be opposed to the scanning line Y in the row direction. In the case where the conductive layer 260 is disposed in a manner to overlap the scanning line Y in the row direction, the black matrix 340 is disposed so as to be opposed to the signal line X in the column direction. In many cases, the pixel PX has a substantially rectangular shape having a short side along the row direction and a long side along the column direction. In such cases, the effect of improvement of the aperture ratio is greater when the conductive layer 260 is disposed in a manner to overlap the signal line X in the column direction, than when the conductive layer 260 is disposed in a manner to overlap the scanning line Y in the row direction.

In the case where the conductive layer 260 is disposed so as to be opposed to the signal line X and scanning line Y in the column direction and row direction, the black matrix is basically needless. However, in a case where a gap occurs between the pixels PX of the color filter layer 320 in the counter-substrate 300, it is desirable to dispose the black matrix in order to bury the gap. In such a case, there is no need to design the width of the black matrix in consideration of misalignment between the array substrate 200 and counter-substrate 300. In other words, the width of the black matrix can be made less than the width L of the black matrix 340 in the comparative example. Therefore, even if the black matrix is disposed in the counter-substrate 300, the aperture ratio can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

In the present embodiment, the operation mode is not particularly limited. Applicable modes are, for instance, normally white modes, such as a TN (Twisted Nematic) mode and an OCB (Optically Compensated Bend) mode, wherein black display is effected by applying a high voltage to a liquid crystal layer, and normally black modes, such as an FFS (Field Fringe Switching) mode and a VA (Vertical Aligned) mode, wherein black display is effected in a state in which no voltage is applied to a liquid crystal layer or a voltage less than a threshold is applied to the liquid crystal layer. In particular, in the normally white mode liquid crystal display device, a strong alignment restriction force acts on the liquid crystal layer 400 between neighboring pixel electrodes 230 due to the black display voltage Vb that is applied between the conductive layer 260 and counter-electrode 330. Accordingly, since the normally white mode liquid crystal display device is less susceptible to the effect of the voltage between the pixel electrode 230 and counter-electrode 330, which is necessary for image display, the decrease in aperture ratio can further be suppressed.

What is claimed is:

1. A liquid crystal display device which is configured such that a liquid crystal layer is held between a pair of substrates, the liquid crystal display device, in a display area including a plurality of pixels, comprising:
   pixel electrodes which are disposed in association with the respective pixels;
   a counter-electrode which is disposed to be opposed to a first side of the pixel electrodes via the liquid crystal layer;
   scanning lines which are disposed along a row direction of the pixels;
   signal lines which are disposed along a column direction of the pixels; and
   an electrically conductive layer which is disposed to be opposed to the counter-electrode via the liquid crystal layer between neighboring ones of the pixel electrodes, and has such a potential as to provide a black display voltage relative to a potential of the counter-electrode,
   wherein a width of the electrically conductive layer is greater than a spacing between the neighboring ones of the pixel electrodes, and the electrically conductive layer is disposed in a manner to overlap end portions of the neighboring ones of the pixel electrodes via an insulation layer, wherein the electrically conductive layer is formed of a light-transmissive, electrically conductive material,
   the electrically conductive layer is opposed to a second side of the pixel electrodes, the second side being opposed to the first side.

2. The liquid crystal display device according to claim 1, wherein the electrically conductive layer is disposed along the column direction and overlaps the signal lines via an insulation layer.

3. The liquid crystal display device according to claim 1, wherein the electrically conductive layer is disposed along the row direction and overlaps the scanning lines via an insulation layer.

4. The liquid crystal display device according to claim 1, wherein the liquid crystal display device is a normally white mode liquid crystal display device.

5. A liquid crystal display device which is configured such that a liquid crystal layer is held between a pair of substrates, the liquid crystal display device, in a display area including a plurality of pixels, comprising:
   pixel electrodes which are disposed in association with the respective pixels;
   a counter-electrode which is disposed to be opposed to a first side of the pixel electrodes via the liquid crystal layer;
   scanning lines which are disposed along a row direction of the pixels;
   signal lines which are disposed along a column direction of the pixels; and
   an electrically conductive layer which is disposed to be opposed to the counter-electrode via the liquid crystal layer between neighboring ones of the pixel electrodes, and has such a potential as to provide a black display voltage relative to a potential of the counter-electrode,
   wherein the electrically conductive layer is disposed along the column direction and overlaps the signal lines via an insulation layer, wherein the electrically conductive layer is formed of a light-transmissive, electrically conductive material, the electrically conductive layer is opposed to a second side of the pixel electrodes, the second side being opposed to the first side.

6. The liquid crystal display device according to claim 5, wherein the liquid crystal display device is a normally white mode liquid crystal display device.

7. A liquid crystal display device which is configured such that a liquid crystal layer is held between a pair of substrates, the liquid crystal display device, in a display area including a plurality of pixels, comprising:
- pixel electrodes which are disposed in association with the respective pixels;
- a counter-electrode which is disposed to be opposed to a first side of the pixel electrodes via the liquid crystal layer;
- scanning lines which are disposed along a row direction of the pixels;
- signal lines which are disposed along a column direction of the pixels; and
- an electrically conductive layer which is disposed to be opposed to the counter-electrode via the liquid crystal layer between neighboring ones of the pixel electrodes, and has such a potential as to provide a black display voltage relative to a potential of the counter-electrode,
- wherein the electrically conductive layer which is disposed along the row direction and overlaps the scanning lines via an insulation layer, wherein the electrically conductive layer is formed of a light-transmissive, electrically conductive material,
- the electrically conductive layer is opposed to a second side of the pixel electrodes, the second side being opposed to the first side.

8. The liquid crystal display device according to claim 7, wherein the liquid crystal display device is a normally white mode liquid crystal display device.

* * * * *